United States Patent [19]
Clover, Jr.

[11] 3,848,239
[45] Nov. 12, 1974

[54] MAGNETIC BUBBLE PROPAGATION

[75] Inventor: Richmond B. Clover, Jr., Sunnyvale, Calif.

[73] Assignee: Hewlett-Packard Company, Palo Alto, Calif.

[22] Filed: Mar. 26, 1973

[21] Appl. No.: 345,050

[52] U.S. Cl. ...................... 340/174 TF, 340/174 SR
[51] Int. Cl. ...................... G11c 11/14, G11c 19/00
[58] Field of Search ................. 340/174 TF, 174 SR

[56] References Cited

UNITED STATES PATENTS

| | | | |
|---|---|---|---|
| 3,713,116 | 1/1973 | Bonyhard et al. | 340/174 TF |
| 3,713,119 | 1/1973 | Bobeck | 340/174 TF |

OTHER PUBLICATIONS

Bell Laboratories Record, "100 Million Bits Per Cubic Inch In New Devices," 1/71, p. 73.

*Primary Examiner*—Stanley M. Urynowicz, Jr.
*Attorney, Agent, or Firm*—Ronald E. Grubman

[57] ABSTRACT

A periodic pattern of permalloy elements is provided for propagating magnetic bubbles in a thin magnetic wafer. Each period of the pattern consists of six permalloy elements, or poles. These poles are arranged so that when a rotating magnetic field is applied to the wafer the various poles will successively attract the bubble, thereby causing the bubble to propagate through the pattern. As the bubble propagates, it is always attracted by three successive poles in the pattern, resulting in a uniform propagation velocity. Additionally, the six pole arrangement provides various modes of propagation for the bubbles, thereby increasing the range of values of the rotating magnetic field and an applied bubble stabilizing field over which the device will operate without propagation failure.

4 Claims, 6 Drawing Figures

MAGNETIC BUBBLE PROPAGATION

BACKGROUND AND SUMMARY OF THE INVENTION

This invention relates generally to magnetic bubble devices and more particularly to a new scheme for smoothly propagating magnetic bubbles at highly uniform velocities.

Magnetic bubbles are cylindrical magnetic domains of a certain polarization which are embedded in a thin magnetic wafer of the opposite polarization, the wafer being typically fabricated from a rare earth iron garnet material such as $Eu_2 Er_1 Fe_4 GaO_{12}$ or $Gd_{1.5} Y_1 Yb_{.5} Fe_4 Ga_1 O_{12}$. These thin magnetic wafers can be overlayed with a pattern of permalloy strips which are used to propagate the bubbles around the wafer. Devices of this kind have potentially wide application as memories in digital computers. For example, the presence of each bubble in a train of bubbles can represent a "1," while the absence of a bubble in the train can represent a "0." It is especially important in applications such as computer memories that the bubbles propagate at high speeds, since the data processing rate depends linearly on the rate at which bubbles pass any given point.

In more detail, the magnetic bubbles are created by applying an external magnetic field to the wafer to collapse the natural domains of the material into cylindrical domains (bubble domains) of a stable diameter. The process is well described by A. H. Bobeck and H. E. D. Scovil in an article entitled *Magnetic Bubbles* in Scientific American, June, 1971. Once the stable magnetic bubbles have been created, they can be propagated around the magnetic film by means of "tracks" comprising a periodic pattern of thin film permalloy strips overlayed on the magnetic film in which the bubbles are embedded. A rotating magnetic field is applied to the wafer, which at any time polarizes particular permalloy strips in a direction and to an extent depending on the angle between a long direction of the strip and the direction of the field at that time. At any particular time (corresponding to a particular phase of the applied field), some elements will attract a particular bubble, while other elements will repel it. As the phase of the rotating field advances through one period, different elements sequentially attract and repel the bubble in such a way that it propagates through one period of the permalloy pattern. Typical patterns heretofore used are "T-bar," "Y-bar," and "chevron" arrangements well known in the prior art.

It has been a problem with the known configurations that the propagation velocity of magnetic bubbles tends to be highly non-uniform. As is described more fully below, this non-uniform velocity can greatly reduce the data processing rate of a memory which uses wafers fabricated from some of the well known garnet materials. The problem arises because each magnetic bubble tends to move erratically as it makes its way from one permalloy element to the next in the pattern. The instantaneous bubble velocity is thus highly non-uniform, having large variations from the average propagation velocity. Now, in many of the commonly used garnet materials there is a limiting velocity which cannot be surpassed by the moving bubbles. If the frequency of the applied field is high enough that at some point in a cycle the velocity of a bubble reaches the limiting velocity, the bubble tends to slip backward. In a memory system for a computing device, the result will be a given bit which has slipped one position. Moreover, the slipped bubble may interfere with another bubble, causing one or the other to be displaced off the permalloy track. To avoid these difficulties, the frequency of the applied field must be limited to ensure that the maximum bubble velocity in any cycle does not exceed the limiting velocity of the magnetic material. This reduces the average propagation velocity, which in turn causes a reduction in the data processing rate.

Another problem with propagating bubbles using the permalloy patterns presently known is that the operating margins for the stabilizing magnetic field (the bias field) and the propagating magnetic field (the drive field) are limited, especially at high propagation velocities. This means that there is only a limited range over which the amplitudes of the bias field and the drive field may vary without inducing failures in the bubble propagation.

It would thus be desirable to propagate magnetic bubbles on a pattern of permalloy elements which produces a substantially uniform bubble velocity, and which allows for wider operating margins of the bias and drive magnetic fields.

According to the illustrated preferred embodiments of the present invention, there is provided a pattern fabricated from a highly permeable magnetic material such as permalloy which utilizes six elements, or poles, in each period of the pattern. As the applied drive magnetic field rotates, at least two successive poles in the structure attract a bubble traversing the pattern at all times, and for almost all phases of the applied field three successive poles attract the bubble. As a consequence of this design, the bubble position as a function of the phase of the applied drive magnetic field is very close to linear. If the angular velocity of the rotating field is a linear function of time, the resulting bubble velocity is then very close to being constant.

Additionally, the six-pole arrangement of the present invention provides different modes of bubble propagation for different values of the applied bias and drive fields, i.e., depending on the magnitudes of the applied fields, the bubbles will tend to traverse the permalloy pattern via certain ones of the permalloy elements. Particularly at high frequencies, these additional modes of propagation increase the operating margins of the device.

DESCRIPTION OF THE INVENTION

Figure 1:
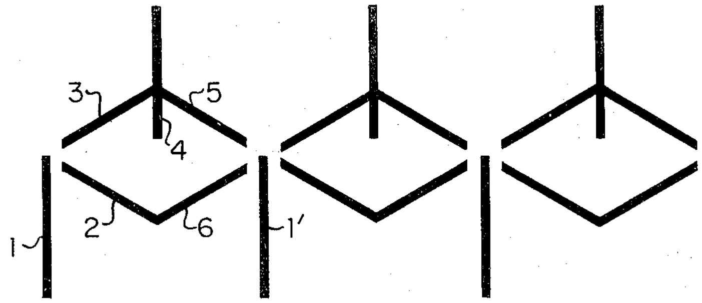
FIG. 1 is a schematic representation of three cycles of a six-pole pattern constructed in accordance with one of the embodiments of the present invention.

In FIG. 1 there are shown schematically three periods of a pattern used to propagate magnetic bubbles. The pattern may preferably be fabricated from permalloy (80–20 NiFe), but other highly permeable magnetic materials may also be used. Each period of the pattern consists of six elements, or poles, numbered 1 through 6. For purposes of description the angular position of each of the poles will be measured counter-clockwise from an axis oriented in a northerly direction in the figure; i.e., the pole numbered 1 is positioned at 0°. Pole number 2, which is one leg of a chevron-like segment of the pattern, is positioned at an angle between 0° and 90°, for example about 60°, but other angles are also suitable. An upper portion of the pattern consists of a tri-pole member resembling a chicken foot or a chevron crossed by a single bar. One pole, numbered 3, is positioned at approximately 120°, and another pole numbered 4 is positioned at about 180°. The last element of the chicken's foot is numbered 5 and is positioned at about 240°. Finally, the pole numbered 6, which is the other leg of the chevron-like segment including pole 2, is positioned at about 300°. These six elements form one period of the pattern. The element numbered 1' is the first member of the next period in the pattern. Although the angular displacements between the various elements are exemplified in this embodiment as being about 60°, other angular displacements may also be used.

Figure 2:
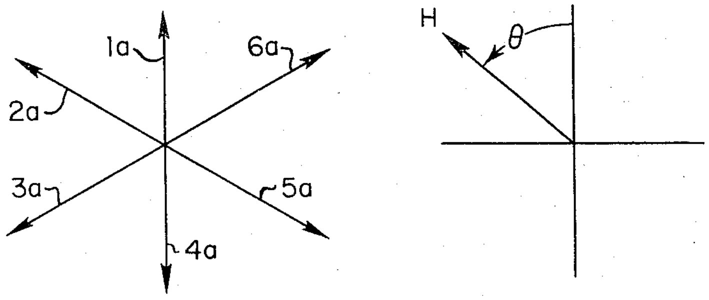
FIG. 2 is a diagram illustrating the relative angular positioning of the elements included in one period of a pattern.

In operation, an external rotating magnetic field is applied to a magnetic wafer containing magnetic bubbles, and on which a permalloy pattern such as that described above is overlayed. The operation of the invention can be understood by reference to FIG. 2 in conjunction with FIG. 1. FIG. 2 shows 6 arrows labeled 1*a* through 6*a*, which are meant to correspond respectively to the six permalloy poles 1 through 6 in FIG. 1. When the phase of the rotating field relative to the above-mentioned axis oriented in the northerly direction (as shown also in FIG. 2) is between 0° and 30°, poles 1*a* and 2*a* (1 and 2 in FIG. 1) will be magnetized along their long dimension, and will attract a magnetic bubble entering the pattern of FIG. 1 from the left. When the phase of the field has rotated past 30°, pole 3*a* will also attract the bubble. Thus, when the phase of the field is between 30° and 90°, poles 1*a*, 2*a*, and 3*a* (1, 2, and 3, respectively, in FIG. 1) all attract the bubble. When the angle becomes greater than 90°, pole 1*a* becomes repulsive and that pole no longer attracts the bubble, but at the same time pole 4*a* (4 in FIG. 1) becomes attractive. Poles 2*a*, 3*a*, and 4*a* (2, 3, and 4, respectively, in FIG. 1) will be attractive when the phase of the field is between 90° and 150°. In a similar manner, it can be seen from FIGS. 1 and 2 that as the bubble progresses to the right it will be attracted by the various poles in sequence, there being always three successive poles attracting the bubble (with the exception that when the phase of the field is at the precise values 30°, 150°, 180°, and 330° only two poles will instantaneously be attractive). It can be noted also that the strength of the magnetization of the permalloy strips is proportional to the cosine of the angle between the long direction of the strip and the direction of the rotating field. Thus, as the field rotates, and successive ones of the permalloy elements attract the bubble, the attractive forces increase and decrease in a smoothly varying manner.

The structure and operation described above lead to propagation of magnetic bubbles at substantially uniform velocity, thereby eliminating the large deviations from the average velocity which can effectively limit the overall operating speed of the device.

Figure 3:
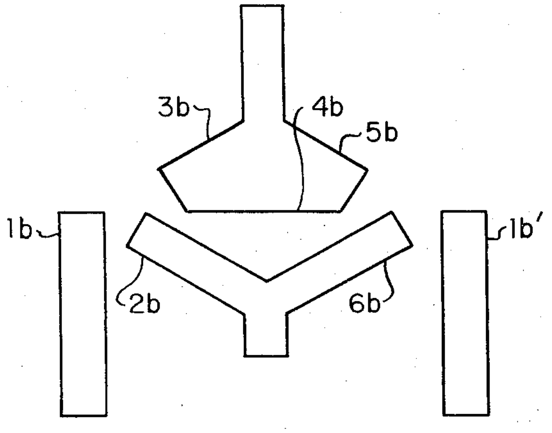
FIG. 3 illustrates another embodiment of the invention in which a tri-pole element is constructed so that the three poles therein are all included in one triangular-like segment.

In FIG. 3 there are shown seven permalloy elements comprising one period of a pattern plus one element of a second period. Elements 1*b*–6*b* correspond to elements 1–6 of FIG. 1, while element 1*b'* corresponds to element 1' of FIG. 1. The width of the permalloy strips is about 3$\mu$m, while the overall length of one period of the pattern is about 24$\mu$m. In this embodiment of the invention, the spaces between poles 3, 4, and 5 are filled in to simplify the fabrication of the pattern.

Figure 4A:
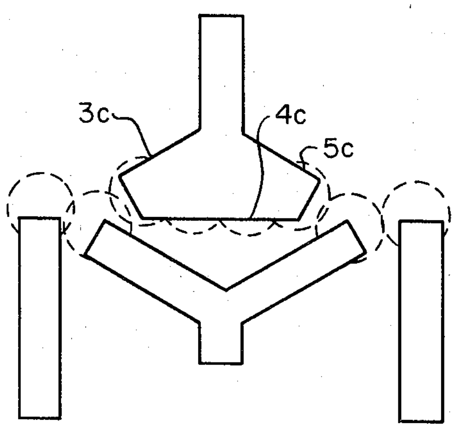
FIGS. 4A–C illustrate three different modes of bubble propagation using a six-pole pattern.
Figure 4B:
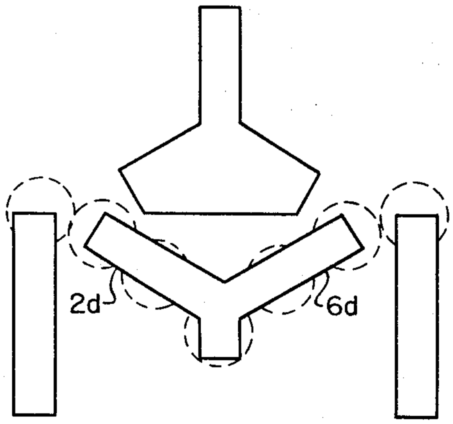
Figure 4C:
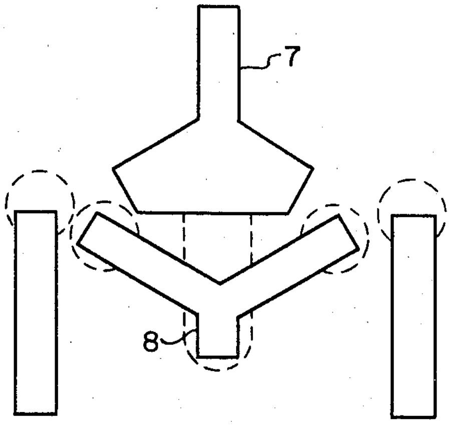

FIGS. 4A–C show three different modes of bubble propagation that have been observed using the pattern illustrated in FIG. 3. In FIG. 4A the bubble tends to propagate via the upper tri-pole piece, including poles 3*c*, 4*c*, and 5*c*. In FIG. 4B, the bubble instead tends to propagate via the lower V-shaped element, including poles 2*d* and 6*d*. In FIG. 4C, as the bubble enters the mid-region of each period of the pattern, it tends to strip out and propagate as an elongated domain via both the upper and lower permalloy elements 7 and 8, respectively. As the magnitudes of the bias magnetic field and the driving magnetic field are varied, the bubble can propagate in any of the various modes shown. This makes a propagation failure in any particular mode less likely, so that particularly at high frequencies, the operating margins of the device will be increased.

I claim:

1. A pattern of elements fabricated from a highly permeable magnetic material for use in conjunction with a rotating magnetic field to propagate magnetic bubbles in a magnetic material, said pattern comprising a periodic array of elements, each period of the array comprising a first linear element, first and second oppositely facing chevron-like elements, both of said chevron-like elements positioned adjacent to the same end of the first linear element and having a common axis of symmetry aligned parallel to the first linear element, and a second linear element positioned along this common axis of symmetry and intersecting the first chevron-like element.

2. A pattern of elements as in claim 1 wherein the first and second chevron-like elements each comprise a V-shaped element having two linear elements intersecting at an angle of about 120°.

3. A pattern of elements as in claim 1 wherein the first chevron-like element and a portion of the second linear element crossing through the tip of the first chevron-like element are both included in one triangular-shaped element.

4. A pattern of elements as in claim 1 wherein the highly permeable magnetic material is permalloy (80–20 NiFe).

* * * * *